United States Patent
Dara et al.

(10) Patent No.: US 7,672,915 B2
(45) Date of Patent: Mar. 2, 2010

(54) METHOD AND SYSTEM FOR LABELLING UNLABELED DATA RECORDS IN NODES OF A SELF-ORGANIZING MAP FOR USE IN TRAINING A CLASSIFIER FOR DATA CLASSIFICATION IN CUSTOMER RELATIONSHIP MANAGEMENT SYSTEMS

(75) Inventors: Rozita A. Dara, Guelph (CA); Mohammad Tauseef Khan, Kitchener (CA); Jawad Azim, Guelph (CA); Orlando Cicchello, Waterloo (CA); Gary P. Cort, Conestogo (CA)

(73) Assignee: Research In Motion Limited, Waterloo, Ontario (CA)

( * ) Notice: Subject to any disclaimer, the term of this patent is extended or adjusted under 35 U.S.C. 154(b) by 286 days.

(21) Appl. No.: 11/467,344

(22) Filed: Aug. 25, 2006

(65) Prior Publication Data

US 2008/0071708 A1    Mar. 20, 2008

(51) Int. Cl.
G06F 15/18 (2006.01)
G06E 1/00 (2006.01)
G06N 7/00 (2006.01)

(52) U.S. Cl. .................................................... 706/20
(58) Field of Classification Search .................. 706/20
See application file for complete search history.

(56) References Cited

U.S. PATENT DOCUMENTS

| | | | |
|---|---|---|---|
| 6,260,036 B1 | 7/2001 | Almasi et al. | |
| 6,654,728 B1 | 11/2003 | Li et al. | |
| 6,892,194 B2 * | 5/2005 | McClanahan | 706/20 |
| 6,944,602 B2 | 9/2005 | Cristianini | |
| 6,944,612 B2 | 9/2005 | Roustant et al. | |
| 6,987,221 B2 | 1/2006 | Platt | |
| 7,016,815 B2 | 3/2006 | Dempsey et al. | |
| 7,082,419 B1 | 7/2006 | Lightowler | |
| 7,092,922 B2 | 8/2006 | Meng et al. | |
| 7,092,941 B1 | 8/2006 | Campos | |

OTHER PUBLICATIONS

Wu, Y., Liu, Q. and Huang, T. "An adaptive self-organizing color segmentation algorithm with application to robust real-time human Hand Localization", Proc. Asian Conf. on Computer Vision, 2000.*

(Continued)

*Primary Examiner*—David R Vincent
*Assistant Examiner*—Li-Wu Chang
(74) *Attorney, Agent, or Firm*—Stephen A. Bucchianeri; Brij K. Agarwal; Eckert Seamans Cherin & Mellott, LLC

(57) ABSTRACT

The described embodiments relate to methods and systems for data classification using a self-organizing map. Certain embodiments relate to a method of labeling data for training a classifier, comprising: obtaining data, the data comprising labeled data and unlabeled data; generating a self-organizing map of the data; and a labeling at least some of the unlabeled data based on proximity of the unlabeled data to labeled data within the self-organizing map to generate self-labeled data. The method may include training a classifier based on the labeled and self-labeled data. Other embodiments relate to systems and computer readable media configured to perform, or allow performance of, the method embodiments.

15 Claims, 11 Drawing Sheets

OTHER PUBLICATIONS

Ben Krose and Patrick Van Der Smagt, "An Introduction to Neural Networks, Eighth Edition" The University of Amsterdam, The Netherlands, Nov. 1996.

A. Famili, W. Shen, R. Weber and E. Simoudis, "Data Preprocessing and Intelligent Data Analysis" Intelligent Data Analysis, 1(1), 1997, pp. 3-23.

Fabio Gagliardi Cozman, Ira Cohen and Marcelo Cesar Cirelo, "Semi-Supervised Learning of Mixture Models," Proceedings of the ICML, Washington, DC, 2003, pp. 99-106.

Pedro J. Moreno and Shivani Agarwal, "An Experimental Study of EM-Based Algorithms for Semi-Supervised Learning in Audio Classification" Proceedings of the ICML, Washington, DC 2003.

Kjersti Aas and Line Eikvil, "Text Categorization: A Survey," Technical Report, Norwegian. Computer Center, 1999.

Meisel, W.S., "Computer-Oriented Approaches to Pattern Recognition," Academic Press, 1972, New York (XP002282415).

Stacey, D.A. et al.: "A SOM/MLP Hybrid Network That Uses Unlabeled Data to Improve Classification Performance", Smart Engineering System Design: Neural Networks, Fuzzy Logic, Evolutionary Programming, Data Mining and Complex Systems. Proceedings of the Artificial Neural Networks in Engineering Conference, vol. 10, Nov. 5, 2000, XP008073219.

Gabrys, B. et al.: "Combining Labelled and Unlabelled Data in the Design of Pattern Classification Systems", International Journal of Approximate Reasoning Elsevier USA, vol. 35, No. 3, Mar. 2004, XP007901506.

Dara, R. et al.: "Clustering Unlabeled Data with SOMs Improves Classification of Labeled Real-World Data", Proceedings of the 2002 International Joint Conference on Neural Networks, IJCNN '02, Honolulu, Hawaii, May 12-17, 2002, International Joint Conference on Neural Networks, New York, NY: IEEE, US, vol. 3 of 3, 2002, XP007901501.

Merkl, D. et al.: "Automatic Labeling of Self-Organizing Maps for Information Retrieval", Proceedings of International Conference on Neural Information Processing, vol. 1, Nov. 16, 1999, XP007901500.

Schweighofer, E. et al.: "Improving the Quality of Labels for Self-Organising Maps Using Fine-Tuning", Database and Expert Systems Applications, 2001, Proceedings, 12th International Workshop on Sep. 3-7, 2001, Piscataway, NJ, USA, IEEE, Sep. 3, 2001, XP010558833.

Blum, A. et al.: "Combining Labeled and Unlabeled Data with Co-Training", Proceedings of the 11th Annual Conference on Computational Learning Theory, Colt '98, Madison, WI, Jul. 24-26, 1998, Annual Conference on Computational Learning Theory, New York, NY: ACM, US, 1998, XP007901502.

* cited by examiner

METHOD AND SYSTEM FOR LABELLING UNLABELED DATA RECORDS IN NODES OF A SELF-ORGANIZING MAP FOR USE IN TRAINING A CLASSIFIER FOR DATA CLASSIFICATION IN CUSTOMER RELATIONSHIP MANAGEMENT SYSTEMS

TECHNICAL FIELD

Embodiments relate to methods and systems for data classification using a self-organizing map. In particular, embodiments use a self-organizing map to label at least some unlabeled data within a data set.

BACKGROUND

Machine learning algorithms have been shown to be practical methods for real-world recognition problems. They also have proven to be efficient in domains that are highly dynamic with respect to many values and conditions. Some machine learning algorithms are suitable for classification (or predictive modeling), while others have been developed for clustering (or descriptive modeling) purposes. Clustering is used to generate an overview of the relationship of the data records. The output of such algorithms may be several clusters, where each cluster contains a set of homogeneous records. As applied to analytical customer relationship management (CRM), for example, clusters may comprise groups of customer records with similar characteristics. For clustering, no labeled data is needed. In classification, on the other hand, a set of known, fixed categories and a pool of labeled records (known as training data) are needed to build a classification model. Classification models can be widely used in analytical CRM systems to categorize customer records into predefined classes.

One of the obstacles to classification is the lack of available labeled data. A problem that arises in various application domains is the availability of large amounts of unlabeled data compared to relatively scarce labeled data. Recently, semi-supervised learning has been proposed with the promise of overcoming this issue and boosting the capability of learning algorithms. Semi-supervised learning uses both labeled and unlabeled data and can be applied to improve classification and clustering algorithm performance.

Unlabeled data can be collected by automated means from various databases, while labeled data may require input from human experts or other limited or expensive categorization resources. The fact that unlabeled data is readily available, or inexpensive to collect, can be appealing and one may want to use them. However, despite the natural appeal of using unlabeled data, it is not obvious how records without labels can help to develop a system for the purpose of predicting the labels.

BRIEF DESCRIPTION OF THE DRAWINGS

Embodiments are described in further detail below, by way of example, with reference to the accompanying drawings, in which.

DETAILED DESCRIPTION

Figure 1:
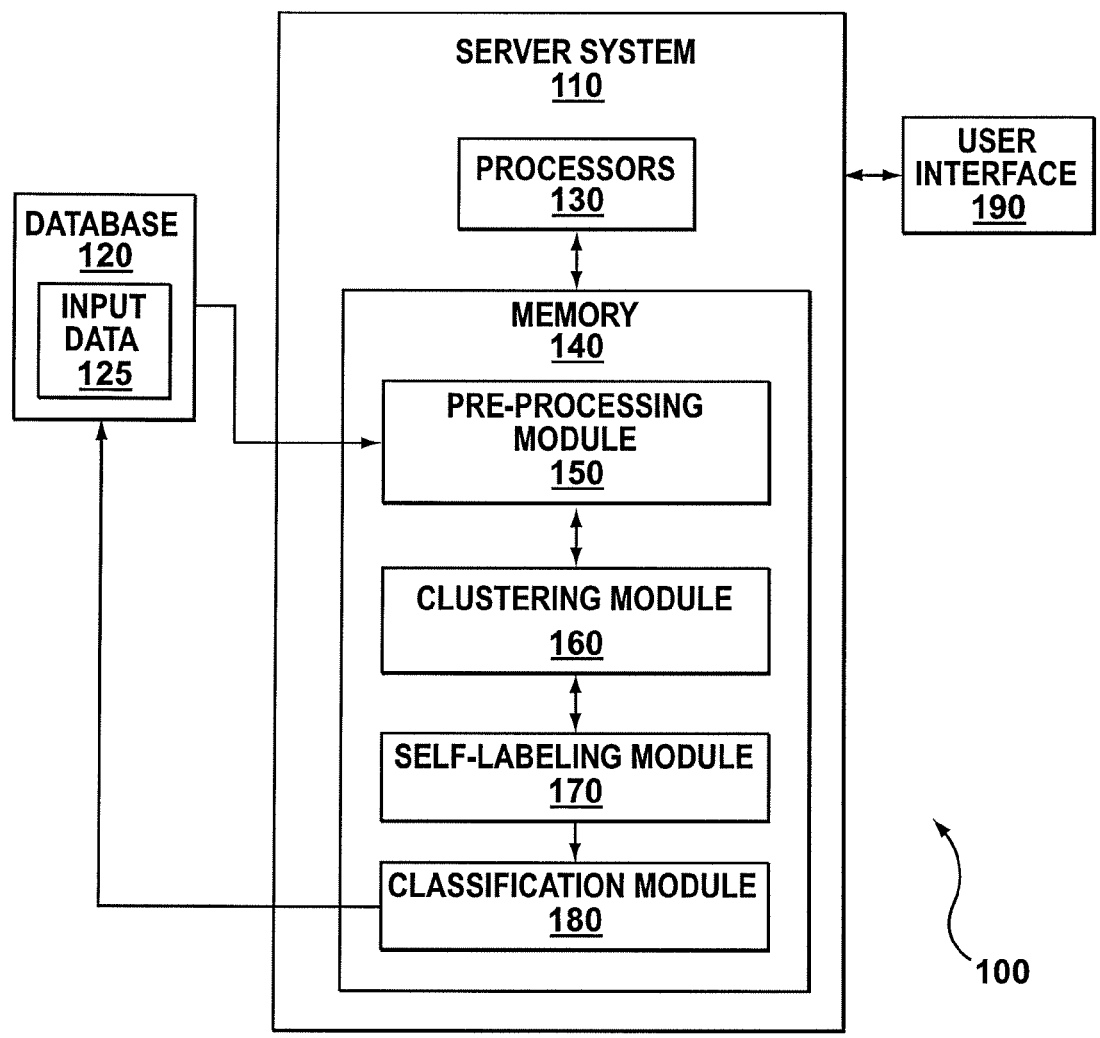
FIG. 1 is a block diagram of a system for use in generating training data for classification.

The embodiments described herein relate generally to systems and methods for generating training data using a self-organizing map. The training data can then be used to train a classifier for data classification. The data used to populate the self-organizing map consists of a small amount of labeled data and a relatively much larger amount of unlabeled data. Through proximity of the unlabeled data to the labeled data in nodes of the self-organizing map, labels can be assigned to the unlabeled data. Embodiments implement a hybrid neural network model to combine a large set of unlabeled data with a small set of labeled records for use in classification. Embodiments may be applied to analytical CRM or in systems tracking large quantities of user data, for example for auto-completion or auto-selection functions.

Embodiments may also be applied to various uses that can be categorized as prediction, regression or modeling applications. Embodiments can be used in fields in medicine, forecasting (e.g. business or weather), software engineering (e.g. software defect prediction or software reliability modeling), manufacturing (e.g. optimization and troubleshooting) and data-mining. Embodiments may also be used in financial areas, such as for credit scoring and fraud detection. Embodiments may also be used in bioinformatics fields, such as analysis of protein structure alignment, genomics studies and micro-array analysis.

Some specific uses of embodiments in the field of medicine include: location of common health-related characteristics in large amounts of data; improved forecasting of results based on existing data, such as patient recovery time or changes to device settings; prediction of the likely progression of medical data over time, such as cell growth or disease dispersion; identification of specific characteristics in medical imagery, such as ultrasound or x-ray feature detection; and grouping of medical data based on key characteristics, such as demographics and pre-existing conditions.

Certain embodiments relate to a method of labeling data for training a classifier, comprising: obtaining data, the data comprising labeled data and unlabeled data; generating a self-organizing map of the data; labeling at least some of the unlabeled data based on proximity of the unlabeled data to labeled data within the self-organizing map to generate self-labeled data. The method can also comprise training a classifier based on the labeled and self-labeled data.

The labeling may be based on a proximity relationship of unlabeled and labeled data within a neighborhood of nodes of the self-organizing map. The amount of labeled data may be increased by adding the self-labeled data and the labeling is repeated. For example, generating and labeling may be repeated a predetermined number of times. The generating and/or labeling may be repeated until a predetermined termination condition is satisfied.

The labeling may be repeated until a predetermined termination condition is satisfied. The method may also comprise auto-completing (i.e. automatically completing) a data field or a user selection using the classifier. The labeling may comprise labeling unlabeled data associated with each of a plurality of nodes in the self-organizing map with a label of labeled data associated with the respective node. The labeling may further comprise, for each neighborhood around a node associated with labeled data, determining whether data associated with nodes within a predetermined neighborhood depth have different labels and, if not, labeling all unlabeled data associated with nodes in the respective neighborhood with the label of the labeled data in that neighborhood. The predetermined neighborhood depth may be two, for example. The labeling may further comprise, where nodes within a same neighborhood are determined to be associated with different labeled data, labeling unlabeled data associated with nodes in the same neighborhood that are adjacent only one node associated with labeled data, wherein the unlabeled data is assigned the label of the labeled data associated with the one adjacent node.

Another embodiment relates to a system for labeling data for use in data classification, comprising: at least one processor; a memory accessible to the at least one processor and storing program instructions executable by the at least one processor, the program instructions being arranged in a plurality of modules comprising a clustering module and a self-labeling module; wherein the clustering module is configured to receive data comprising labeled data and unlabeled data and to generate a self-organizing map of the data; and wherein the self-labeling module is configured to label at least some of the unlabeled data based on proximity of the unlabeled data to labeled data within the self-organizing map to thereby generate self-labeled data. The system may further comprise a classification module configured to train a classifier based on the labeled and self-labeled data.

The labeling by the self-labeling module may be based on a proximity relationship of unlabeled and labeled data within a neighborhood of nodes of the self-organizing map. The self-labeling module may be configured to add the self-labeled data to the labeled data and to generate further self-labeled data from the unlabeled data. The self-labeling module may also be configured to iteratively add the self-labeled data to the labeled data and generate further self-labeled data until a predetermined termination condition is satisfied.

The clustering module may be configured to re-generate (i.e. repeat the generation of) the self-organizing map based on the labeled data, the unlabeled data and the self-labeled data. The classifier may be further configured to auto-complete (i.e. automatically complete) a data field or a user selection based on the labeled and self-labeled data. The self-labeling module may be further configured to assign a class to the self-labeled data based on the labeled data in the same neighborhood.

The self-labeling module may be further configured to label unlabeled data associated with each of a plurality of nodes in the self-organizing map with a label of labeled data associated with the respective node. The self-labeling module may be further configured to, for each neighborhood around a node associated with labeled data, determine whether data associated with nodes within a predetermined neighborhood depth have different labels and, if not, labeling all unlabeled data associated with nodes in the respective neighborhood with the label of the labeled data in that neighborhood. The predetermined neighborhood depth may be two. The self-labeling module may be further configured, where nodes within a same neighborhood are determined to be associated with different labeled data, to label unlabeled data associated with nodes in the same neighborhood that are adjacent only one node associated with labeled data so that the unlabeled data is assigned the label of the labeled data associated with the one adjacent node.

Certain embodiments also relate to computer readable storage storing computer program instructions which, when executed by at least one processor, cause the at least one processor to perform a method comprising: obtaining data, the data comprising labeled data and unlabeled data; generating a self-organizing map of the data; labeling at least some of the unlabeled data based on proximity of the unlabeled data to labeled data within the self-organizing map to generate self-labeled data. The method may further comprise training a classifier based on the labeled and self-labeled data.

In some cases, data needs to be pre-processed before building a classification model and analyzing the results. Depending on the type of data, different types of preprocessing may be required. If the source data is purely numerical, only normalization and feature selection may be needed. If the data fields of interest in the database are not numerical, then the data pre-processing task may be more challenging. Automated pre-processing tools may be employed to transform the data into a suitable numerical format. Suitable data pre-processing techniques for use in classification and/or clustering will be understood by those skilled in the art.

A suitable automated text preprocessing technique may employ tokenization, stop word removal, stemming, spell check, and construction of feature records. A TFxIDF (term frequency times inverse document frequency) method may be used for term frequency calculation and information gain may be used for feature selection.

In the described embodiments, a self-organizing map (SOM) form of neural network is used to infer a class associated with unlabeled data based on its proximity to labeled data within the SOM. A SOM is a sheet-like network of nodes which is tuned to various training data records through a learning process. In generating (also called training) the SOM, one or more records, both labeled and unlabeled, may be associated with a node of the SOM.

The SOM thus organizes the training records into clusters, in which similar records are located in nodes close to each other. This unique characteristic of a SOM can be used, along with the small set of labeled data, to obtain more accurate clusters. Furthermore, the resultant clusters and small set of labeled data can be used to classify unlabeled records and obtain additional labeled records (self-labeled records). The self-labeled data is used to reformulate the clusters or to provide a larger data set for a classification task.

The SOM effectively defines a relationship between spatially adjacent nodes which can be exploited for labeling. In the described embodiments, labels are assigned to unlabeled records in a node by examining labeled records in the node itself and in neighboring nodes.

Referring now to FIG. 1, there is shown a block diagram of a system 100 for use in classification of data. System 100 comprises a server system 110, a database 120 accessible to server system 110 and a user interface 190 in communication with the server system 110. Database 120 stores a quantity of input data 125. Database 120 may be distributed or discrete. Input data 125 may include both labeled and unlabeled data records. Initially, the input data 125 may be unlabeled but, subsequent to generation of an initial labeled data set and generation of self-labeled data (described further below), more and more of the unlabeled data may become labeled.

Server system 110 comprises one or more processors 130 and a memory 140. Server system 110 may be a distributed or virtual processing system. Alternatively, server system 110 may correspond to a discrete computer system, such as a personal computer or a mobile electronic device. The processors 130 may be operated in parallel and may be distributed, for example. Alternatively, only one processor 130 may be employed, for example for embodiments implemented by a single computing device, such as a personal computer or a mobile electronic device.

Memory 140 is a non-volatile store that comprises stored program instructions which, when executed by processors 130, cause processors 130 to perform various functions, as described below. At least some of the program instructions stored in memory 140 are organized into software modules. Such modules include a pre-processing module 150, a clustering module 160, a self-labeling module 170 and a classification module 180.

Figure 2:
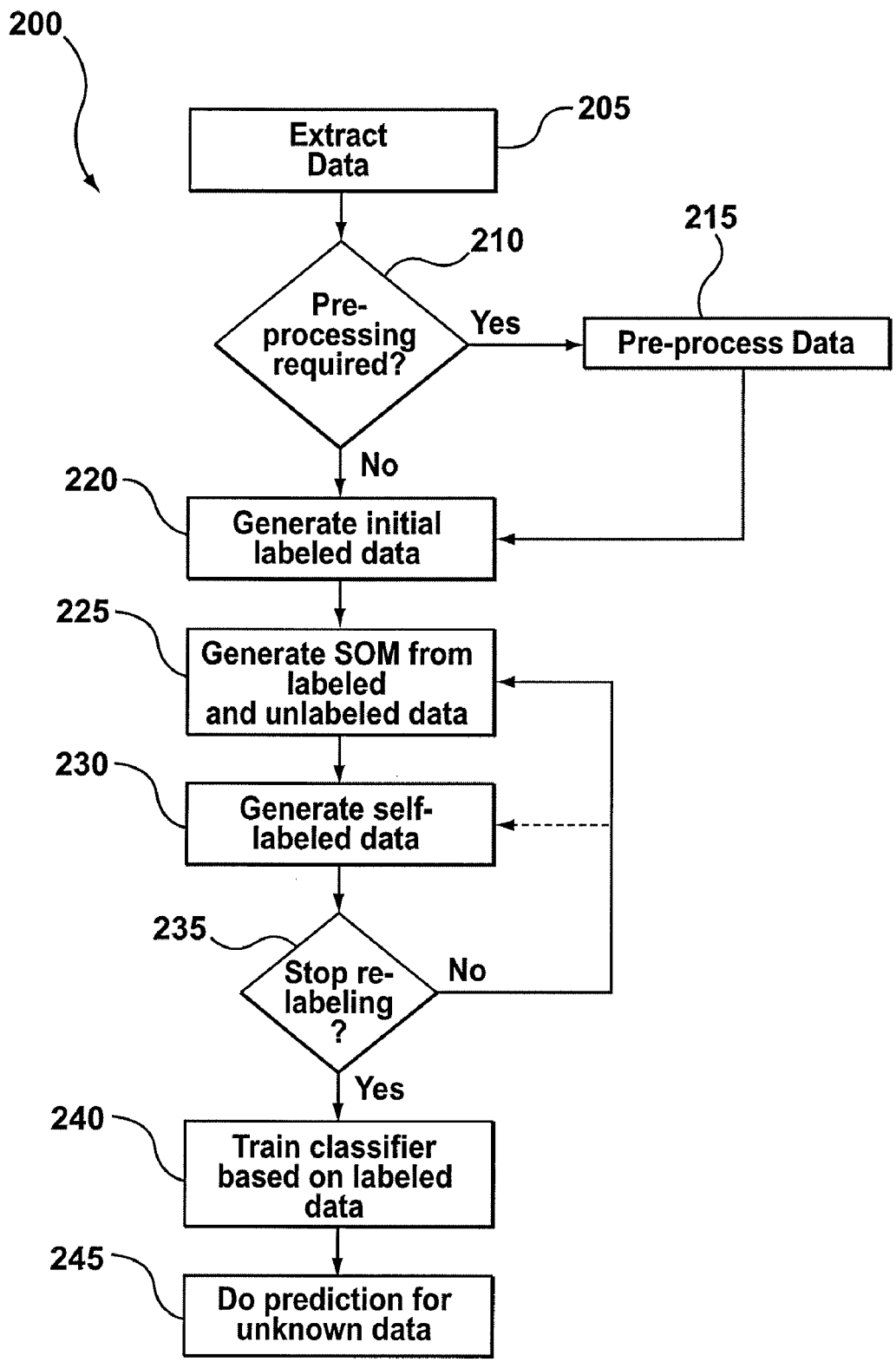
FIG. 2 is a flowchart of a method of generating training data for classification.

Operation of system 100 is described further below, referring also to FIG. 2, which is a flowchart of a method 200 of generating training data for use in classification.

At step 205, pre-processing module 150 extracts the input data 125 from database 120 and processes the data at step 215 according to existing pre-processing techniques, as described above, if required, at step 210. Pre-processing of the input data 125 is only performed if required by the format and/or content of the input data 125. For example, if the input data 125 contains records having a free-text field, pre-processing of the pre-text will need to be done by pre-processing module 150. Input data 125 may be selectively extracted by a query of the database 120 or by a non-selective dump of the database 120. The query may be entered via user interface 190, for example.

Once any necessary pre-processing is done at step 215, pre-processing module 150 provides data of a pre-defined format to clustering module 160. Clustering module 160 takes the input data 125 as processed by pre-processing module 150 and generates an initial labeled data set at step 220 from a relatively small subset of input data 125. Generation of the initial labeled data set is described in further detail below, with reference to FIG. 11. As an alternative to generation of the initial labeled data, it may be obtained from a pre-existing data store or it may be provided by a domain expert, for example.

Figure 4:
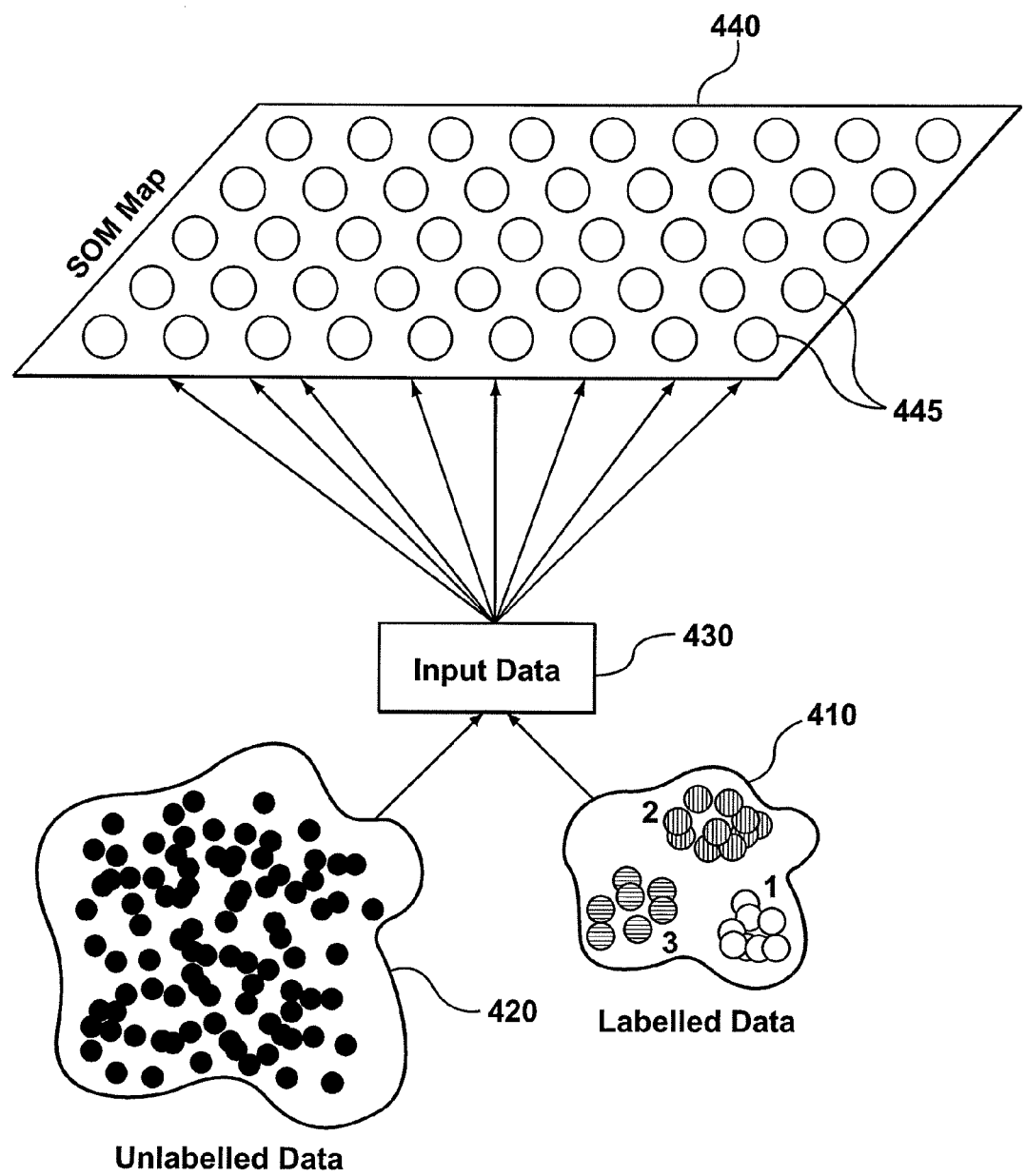
FIG. 4 is a schematic illustration of generation of a self-organizing map using labeled and unlabeled data.

Once the initial labeled data set is generated (if it isn't otherwise obtained), clustering module 160 generates a self-organizing map using the labeled and unlabeled data at step 225. Methods of generation (also called training) of a self-organizing map using a data set will be apparent to persons skilled in the art. Generation of a self-organizing map is shown schematically in FIG. 4, in which labeled data 410 and unlabeled data 420 are used as input data 430 to train SOM 440, with the result that labeled data 410 and unlabeled data 420 are allocated to one or more nodes 445 on the SOM 440.

Once the self-organizing map 440 is trained with the labeled data 410 and unlabeled data 420 at step 225, self-labeling module 170 analyzes the positions of the unlabeled records allocated to nodes in the SOM 440 relative to nodes having labeled records associated therewith to generate self-labeled data at step 230. The method of generation of self-labeled data at step 230 is described in further detail below, with reference to the flowchart of FIG. 3, the schematic illustration of FIG. 5 and the examples shown in FIGS. 8 to 10.

Once the self-labeled data is generated at step 230, self-labeling module 170 determines at step 235 whether further generation of self-labeled data is required, either by repeating step 230 with the same self-organizing map or by retraining the self-organizing map at step 225 using the newly self-labeled data, the labeled data, and the as yet unlabeled data. Retraining the SOM at step 225 may result in the re-organization of some of the data across nodes in the map because of randomizing features normally applied during training of a self-organizing map. Further self-labeled data can then be generated at step 230 based on the SOM retrained at step 225.

At step 235, it may be decided to only repeat step 230, in which case the previously self-labeled data is added to the labeled data and used to generate further self-labeled data at step 230.

Repetition of steps 225 to 235 or 230 to 235 can be called re-labeling. Re-labeling iterations can be extended to arbitrary depths. However, there will usually be a point at which no new labels can be assigned to the remaining set of unlabeled data. As the number of re-labeling iterations increases, the likelihood of contradictory labels on neighboring nodes is increased as well.

The following measures may be taken into consideration to avoid incorrect labeling as much as possible, and to obtain more reliable results:

Limit re-labeling iterations to a small, fixed amount, say 4.
Optimize data preprocessing by employing prior knowledge to weight key words (other than the TF×IDF method). This optimization can result in classes with larger inter-class distances.
If two neighboring nodes are assigned to different classes, they may not be used for the labeling process.
The SOM may be retrained in each re-labeling process to take advantage of new weight randomization and changes in the cluster.

Termination criteria for terminating the re-labeling may include the following: the number of iterations of steps 225 to 235 or 230 to 235 has reached a predetermined iteration limit, such as 3, 4 or 5, for example; the re-labeling iterations have reached a point at which no new labels can be assigned to the remaining set of unlabeled data; or a predetermined number of labeled records has been obtained. This last criterion is relevant when the quantity of the training data is known in advance.

Once self-labeling module 170 determines that a termination criterion exists for terminating the re-labeling, at step 235, the labeled data, including any self-labeled data, is passed to classification module 180, which uses the labeled data to train a classifier. The classifier may be trained using a neural network algorithm, such as multi-layer perceptron (MLP), for example.

Once classification module 180 trains the classifier based on the labeled data at step 240, the classifier can be used for prediction functions with respect to unknown data, at step 245. Such prediction functions may include, for example, auto-completing (i.e. automatically completing) or auto-selecting (i.e. automatically selecting) user input. The classifier can also be used for data analysis and decision-making purposes in the exemplary applications described above. Once the classifier has been trained at step 240, classification module 180 updates database 120 with the labeled data for subsequent use in clustering and/or classification (including prediction).

Figure 3:
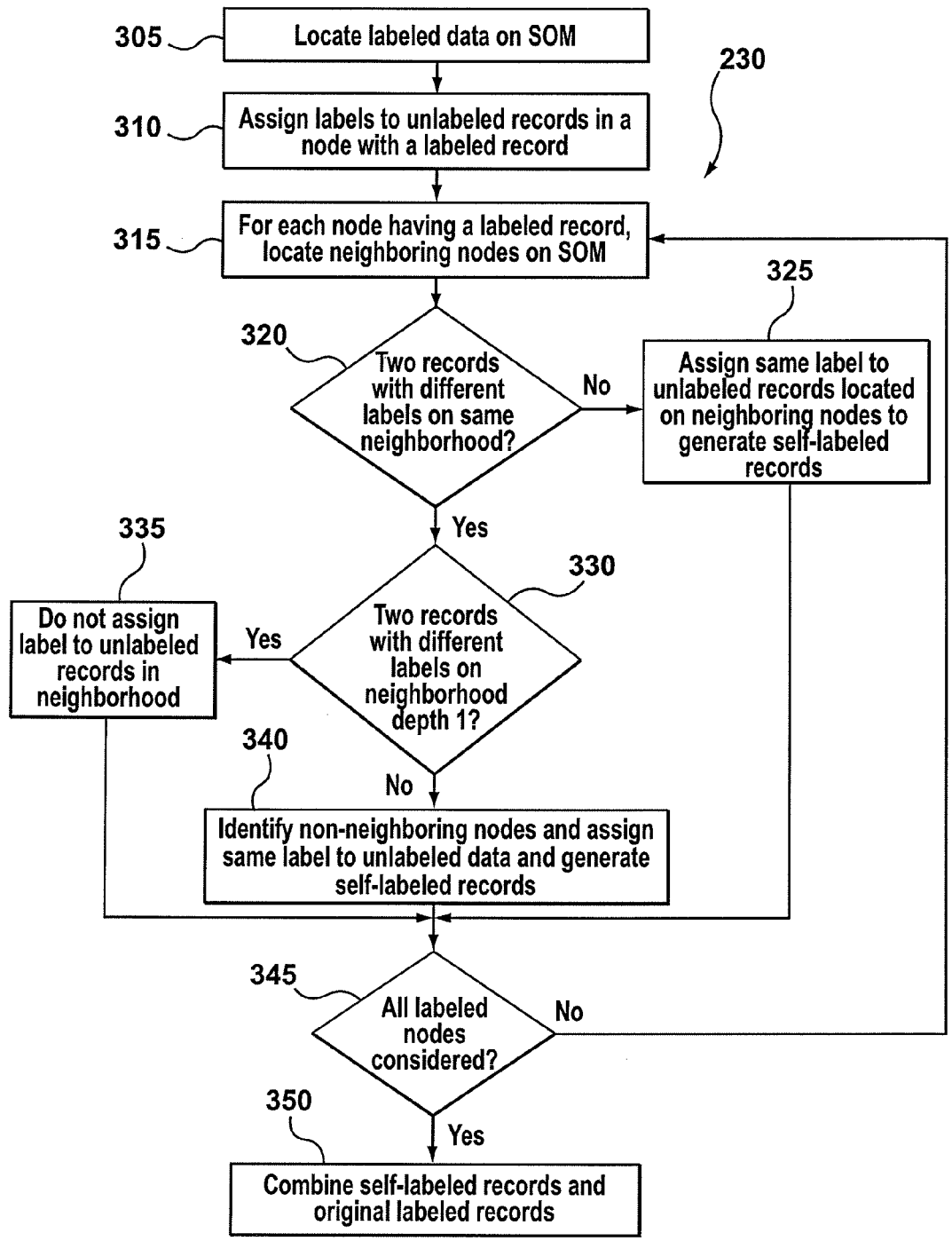
FIG. 3 is a flowchart of a method of self-labeling of unlabeled data.
Figure 5:
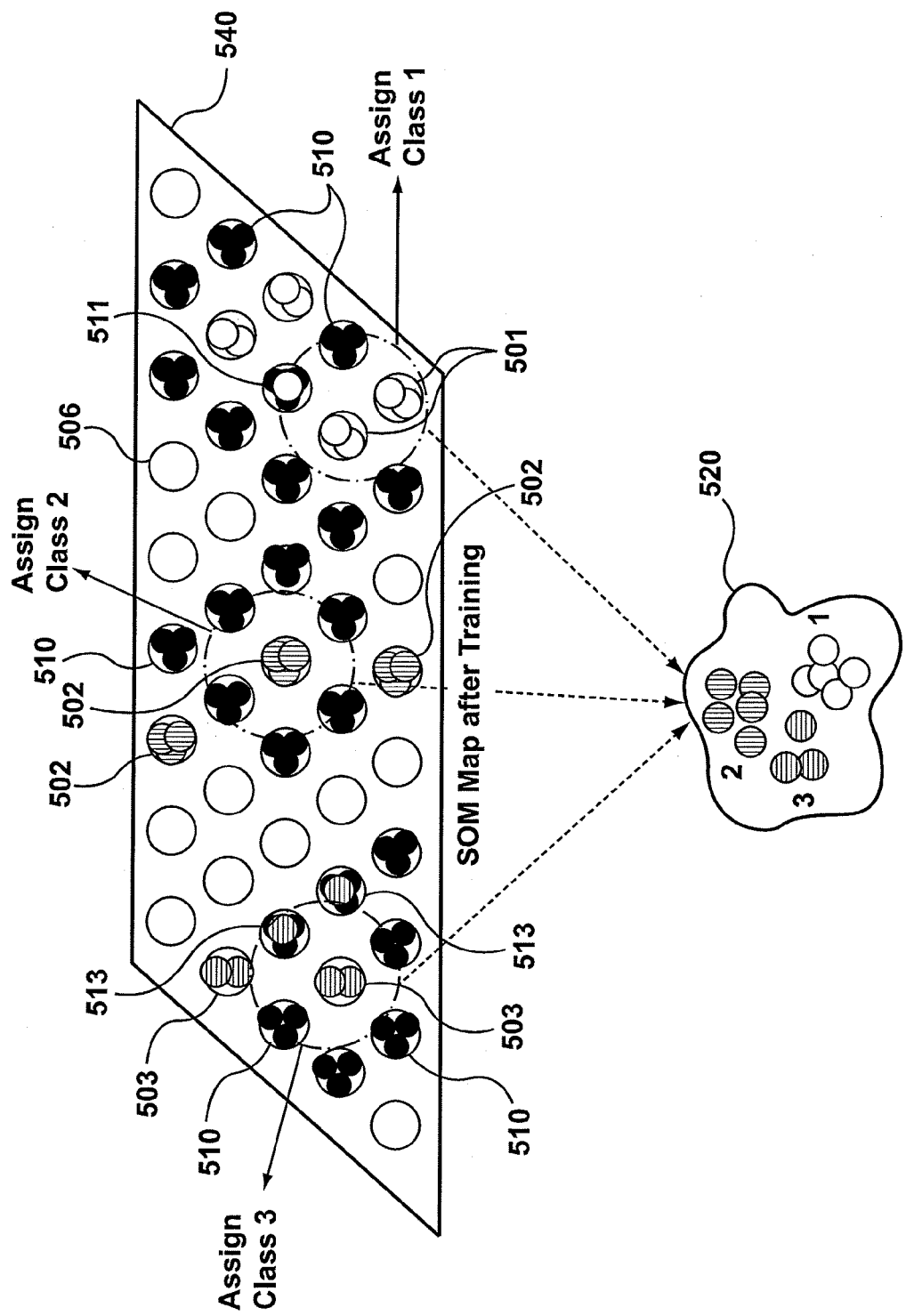
FIG. 5 is a schematic illustration of self-labeling of data records using a self-organizing map.

Referring now to FIG. 3, a method of generation of self-labeled data (step 230) is described in further detail. The method begins at step 305, at which self-labeling module 170 locates all of the labeled data records on the SOM 540, as shown in FIG. 5. FIG. 5 shows SOM 540 after training (or generation) at step 220. Each of the nodes on SOM 540 may have none, one or more (and possibly many) data records associated therewith (or allocated thereto).

FIG. 5 shows the original labeled data trained on SOM 540, with the unlabeled data, where the nodes containing unlabeled records are indicated by reference numeral 510. The original labeled data is divided into three separate classes for illustration purposes. Nodes having labeled records corresponding to class 1 are indicated by reference numeral 501. Nodes having labeled records corresponding to class 2 are indicated by reference numeral 502. Nodes having labeled records corresponding to class 3 are indicated by reference numeral 503. Some nodes have both labeled and unlabeled data. For example, nodes 513 contain labeled records corresponding to class 3, as well as unlabeled records. Similarly, node 511 contains labeled records corresponding to class 1, together with unlabeled records. These nodes will have all of the unlabeled records assigned the label of the labeled record in the node at step 310, as described below. Some nodes of SOM 540 may not have any records associated therewith, and are indicated by reference numeral 506.

Depending on the proximity of nodes having labeled records to nodes having unlabeled records, the unlabeled records may be assigned a label according to the method described below. Such a label assignment may correspond to assigning a class to the unlabeled records. Such unlabeled records then become self-labeled data 520, which may be divided up into a number of classes, such as the three classes shown in FIGS. 4 to 6.

Once the labeled records are located on SOM 540 at step 305, labels are assigned to each of the unlabeled records in each node that has a labeled record associated therewith, at step 310. Thus, if a node has 99 unlabeled records and one labeled record, all 99 unlabeled records will be assigned the label of the one labeled record.

Figure 7:
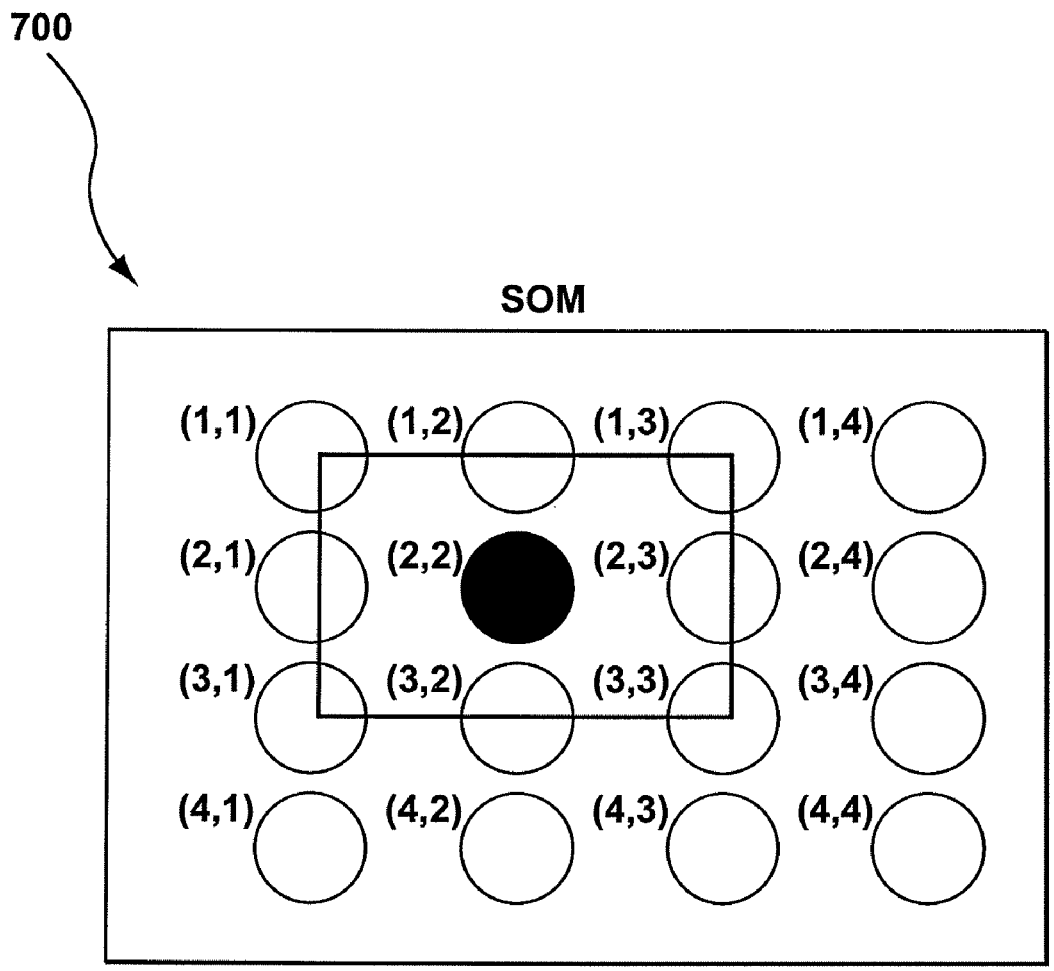
FIG. 7 is a schematic illustration of an example of a self-organizing map using a rectangular neighborhood topology.

At step 315, for each node having a labeled record, self-labeling module 170 locates the neighboring nodes on SOM 540 according to a specified neighborhood topology. The neighborhood topology may be rectangular or hexagonal, for example and may have a specified neighborhood depth. The neighborhood depth may be one or two, for example, and specifies the number of adjacent nodes away from the node under consideration that the neighborhood extends. For example, for a rectangular neighborhood topology with a neighborhood depth of one, the neighborhood would consist of eight neighboring nodes around the node under consideration. For a neighborhood depth of two, the neighborhood would consist of the eight neighboring nodes at depth one and a further sixteen nodes at depth two arranged rectangularly around the nodes at depth one. FIG. 7 illustrates an example SOM 700 having a rectangular topology, where the nodes at a neighborhood depth of one are connected by a black line in the form of a rectangle.

Following step 315, self-labeling module 170 determines, for a particular node having unlabeled records, whether two records with different labels are located in the same neighborhood. If not, at step 325, self-labeling module 170 assigns the same label as the labeled record to the unlabeled records located on (associated with) neighboring nodes, thereby generate self-labeling records. It should be noted that, to the extent that step 310 involves assigning labels to unlabeled records that share a node with a labeled record, this also results in the self-labeling of records.

Figure 8:
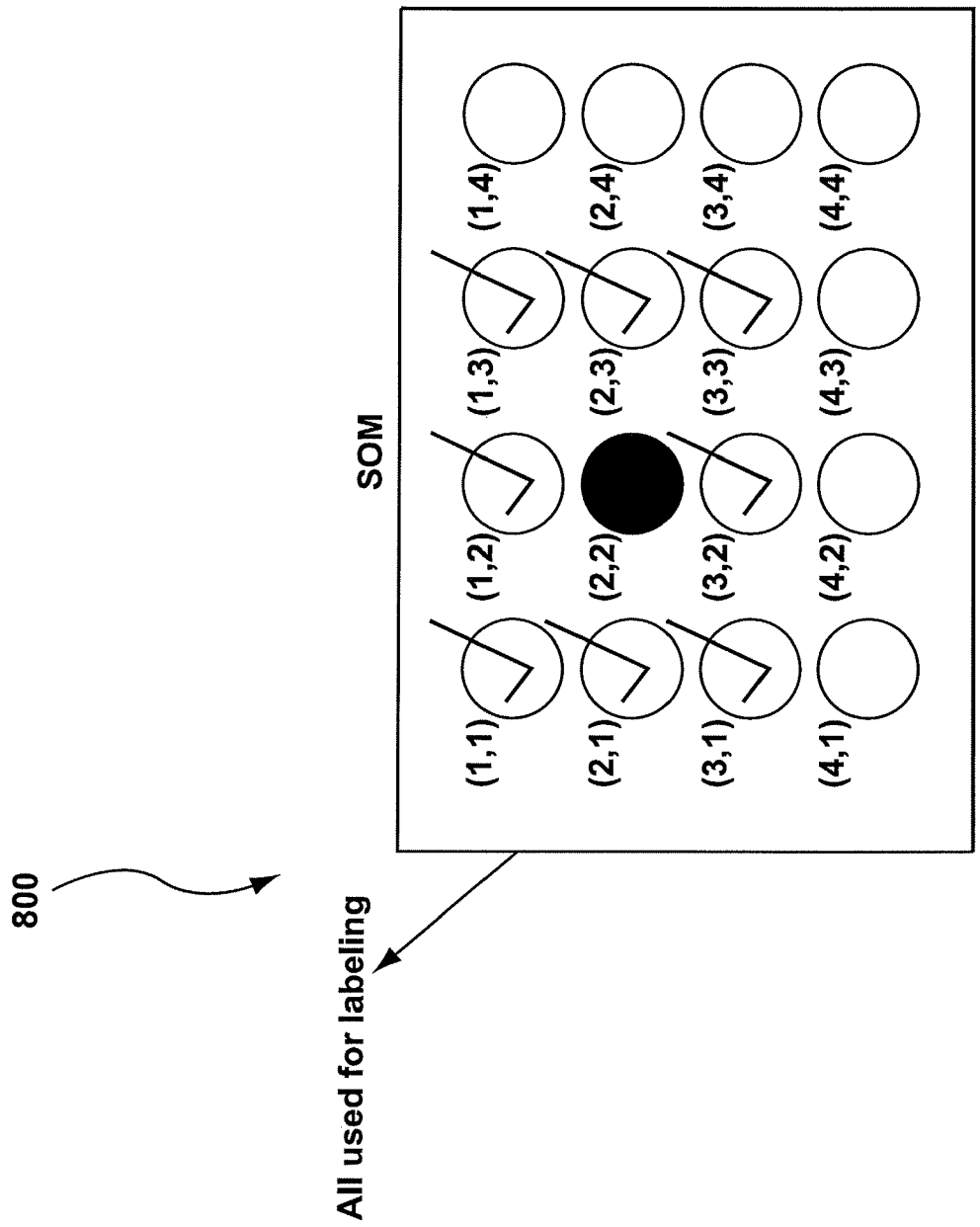
FIG. 8 is a schematic illustration of an example self-organizing map using a rectangular neighborhood topology, in which labels are allocated to unlabeled records in nodes within a neighborhood depth of one around a labeled node.

FIG. 8 illustrates an example SOM 800 in which step 325 is applied to label unlabeled records associated with nodes neighboring node (2,2) at a neighborhood depth of one. Each of the unlabeled records associated with the nodes indicated with a check mark in FIG. 8 are thus assigned the same label as the labeled records in node (2,2).

If, at step 320, self-labeling module 170 determines that two records with different labels are in the same neighborhood, self-labeling module 170 then determines, at step 330, whether the records with different labels are within a neighborhood depth of one. If so, then at step 335, self-labeling module 170 determines that labels should not be assigned to unlabeled records in the neighborhood of each of the nodes having labeled records.

Figure 9:
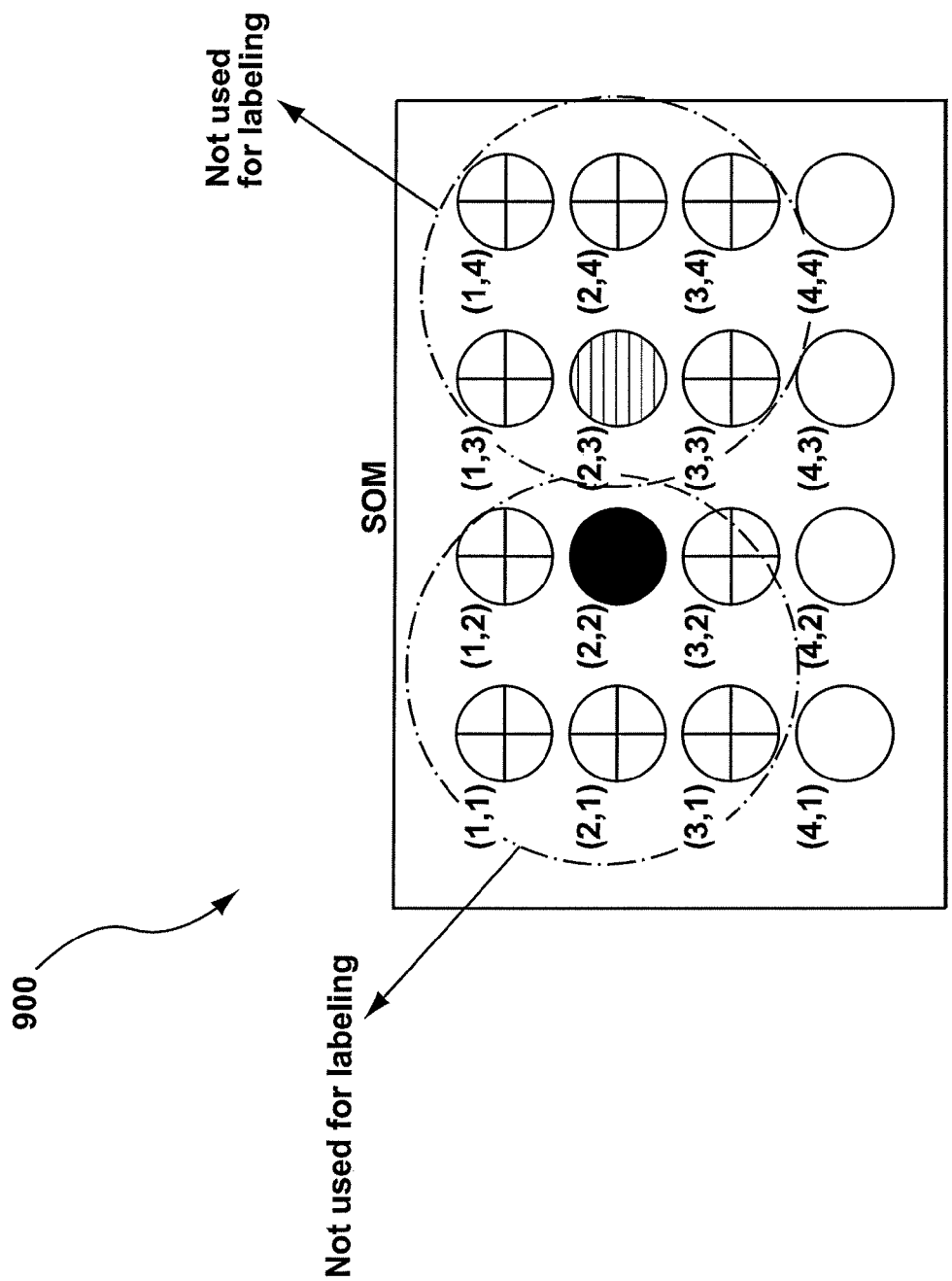
FIG. 9 is a schematic illustration of an example self-organizing map using a rectangular neighborhood topology and showing a scenario where neighboring nodes have different labels.

FIG. 9 illustrates an example SOM 900, where step 335 is executed. In SOM 900, labeled nodes (2,2) and (2,3) are positioned adjacent each other and within a neighborhood depth of one. In this scenario, none of the unlabeled records in the nodes of neighborhood depth one around the nodes having labeled records are assigned labels. The nodes having unlabeled records that are not assigned labels are indicated in FIG. 9 by crosses.

If, at step 330, self-labeling module 170 determines that the two records with different labels in the same neighborhood are not within a neighborhood depth of one relative to each other, then at step 340, self-labeling module 170 identifies the neighboring nodes that do not also neighbor a node having a labeled records and assigns the label of the labeled record to all unlabeled records in those identified nodes, thereby generating self-labeled records.

Figure 10:
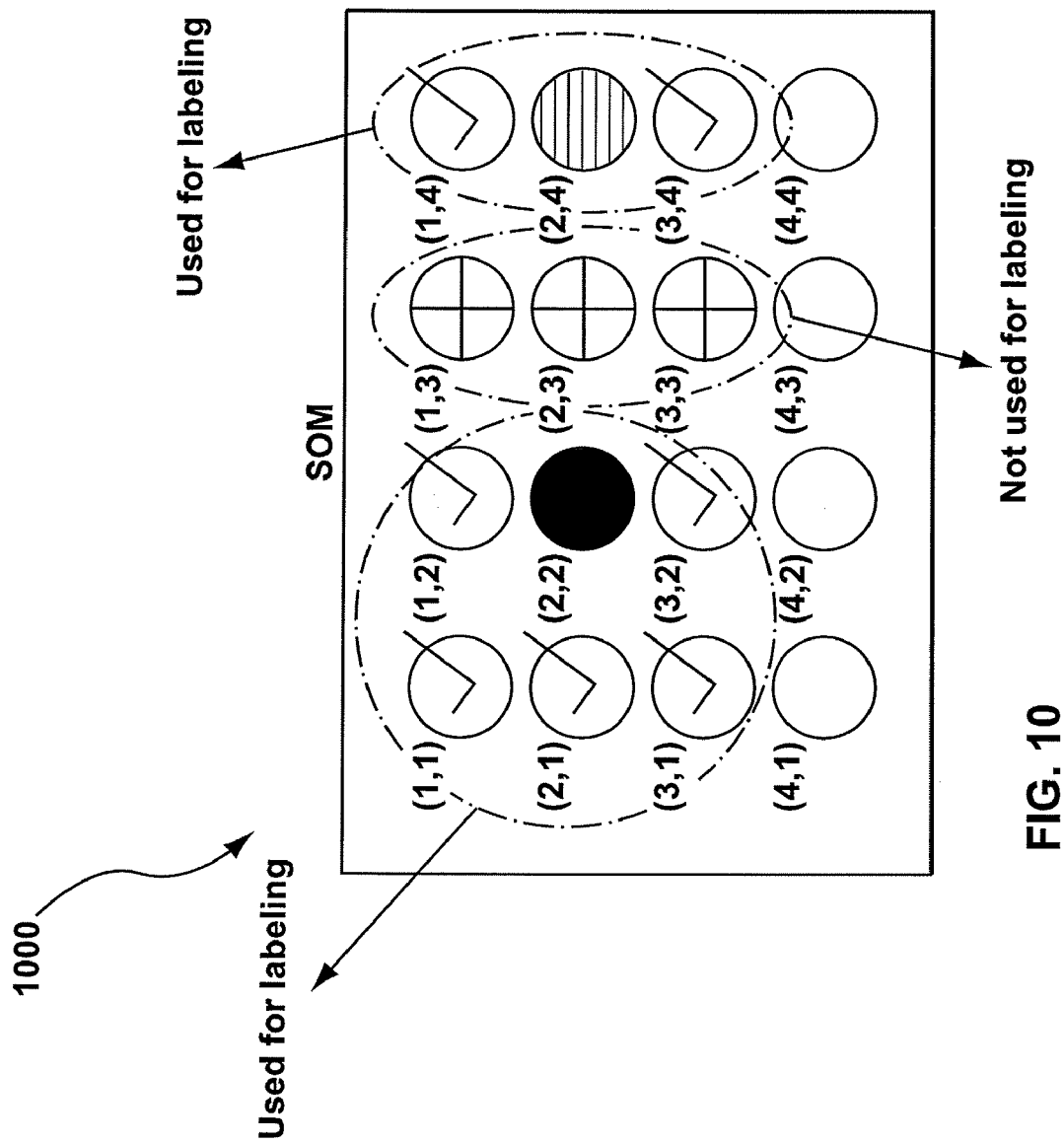
FIG. 10 is a schematic illustration of an example self-organizing map using a rectangular neighborhood topology and showing a scenario where labeled nodes are not directly neighboring each other.

FIG. 10 illustrates an example SOM 1000, in which step 340 is performed. In FIG. 10, nodes (2,2) and (2,4) have differently labeled records, although those nodes are not immediately adjacent each other. Rather, those nodes are within a neighborhood depth of two relative to each other. Accordingly, nodes (1,3), (2,3) and (3,3) that are adjacent to both of the nodes having labeled records are not used for self-labeling purposes. On the other hand, unlabeled records in nodes that are adjacent only one of the differently labeled nodes, but not both, are used for self-labeling purposes. Nodes having unlabeled records that are assigned labels are indicated in FIG. 10 by check marks, while those that are not assigned labels are indicated by crosses.

Once self-labeled records are generated (or not) in steps 320 to 340, self-labeling module 170 checks, at step 345, whether all labeled nodes have been considered for purposes of assigning labels to unlabeled records in neighboring nodes. If not, steps 315 to 340 are repeated, as appropriate. If all labeled nodes have been considered, then at step 350, the self-labeled records are added to the original labeled records to provide an enlarged labeled data set. As mentioned in relation to FIG. 2, the generation of self-labeled data according to step 230 may be iteratively repeated, alone or in combination with retraining of the SOM at step 225.

Figure 6:
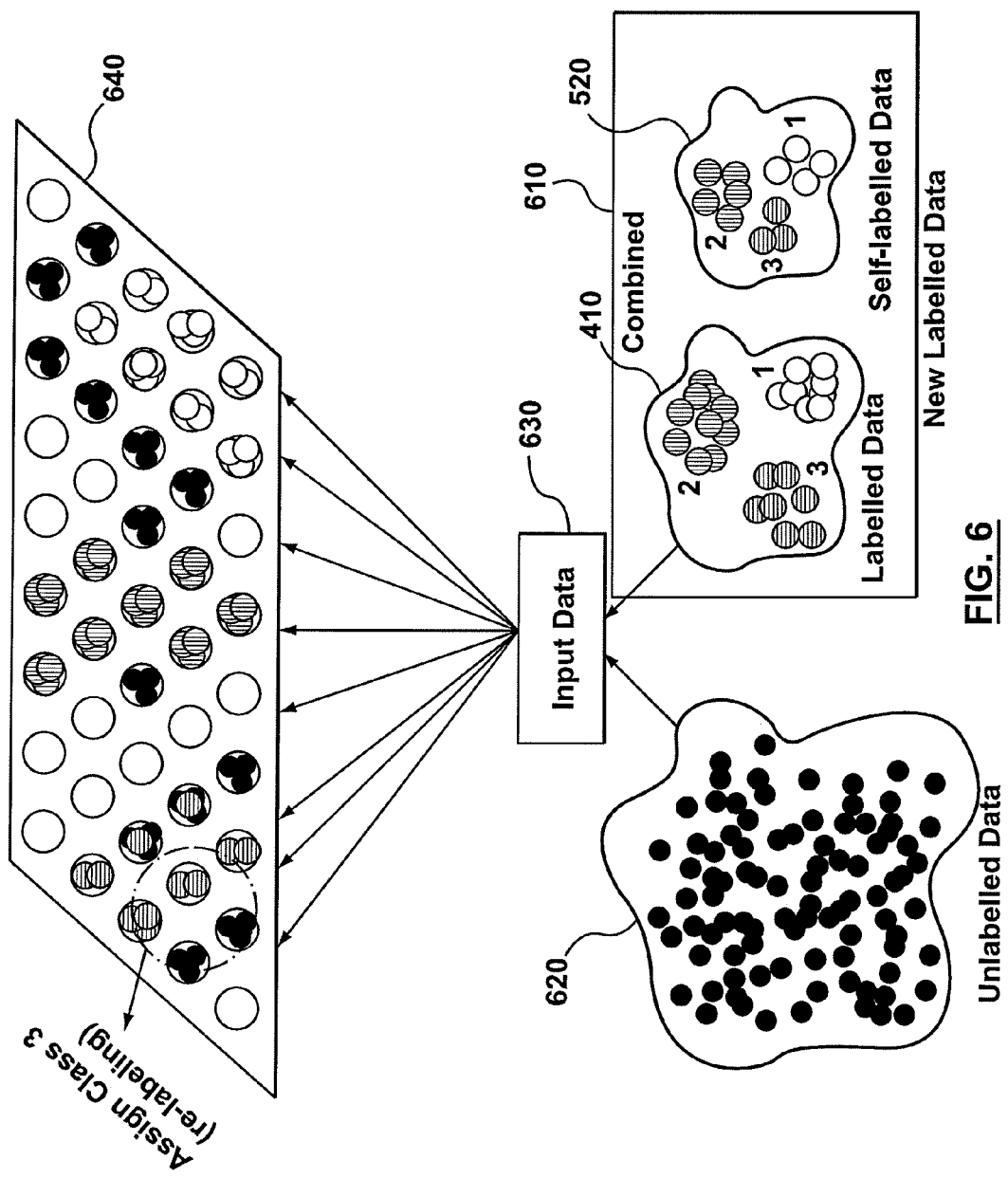
FIG. 6 is a schematic illustration of re-training a self-organizing map using combined labeled and self-labeled data as well as unlabeled data.

Retraining of the SOM is illustrated schematically in FIG. 6, in which new-labeled data 610, comprising original data 410 and self-labeled data 520, is combined with as yet unlabeled data 620 as input data 630 for generating a retrained SOM 640. One potential outcome of retraining the SOM is that some of the nodes or neighborhoods may be redefined and possibly relabeled. The retrained SOM 640 may then be used for further self-labeling of the unlabeled records, as described above in relation to FIG. 3. This may result in a class reassignment for labeled or self-labeled records associated with some nodes.

Figure 11:
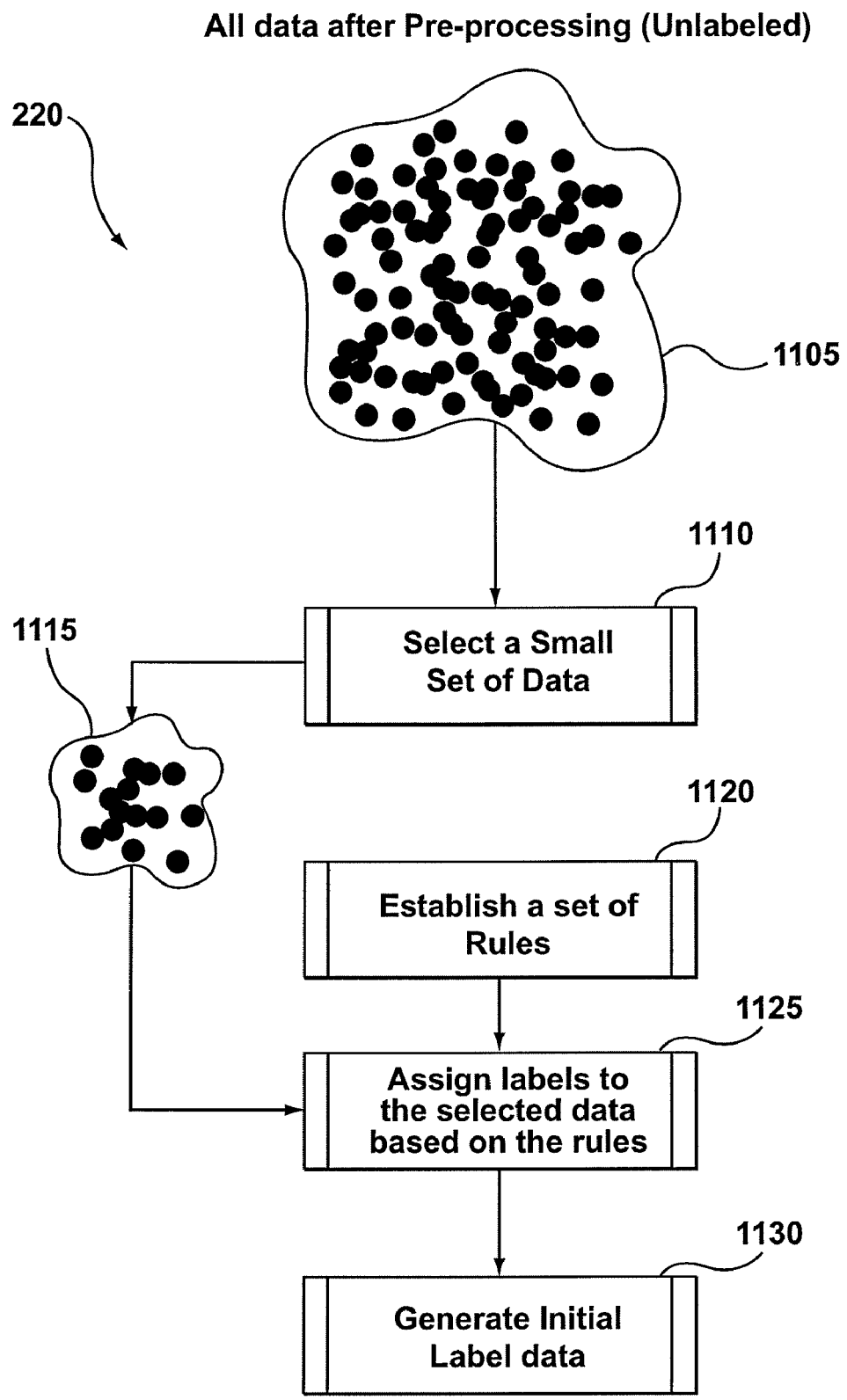
FIG. 11 is a flowchart of a method of generating an initial set of labeled data.

Referring now to FIG. 11, a method of generating initial labeled data (step 220) is described in further detail. The method begins at step 1110, at which a small set of training data 1115 is selected from a large unlabeled data set 1105 by clustering module 160 following pre-processing of the unlabeled data sets 1105. Clustering module 160 may select the training data 1115 randomly or by clustering or according to pre-determined criteria, for example so as to achieve a broadly representative selection of the unlabeled data.

At step 1120, clustering module 160 establishes a set of rules for determining how to label unlabeled data. An example rule may be as follows:

Rule 1: If {Ratio_installation is 1 and Ratio_userError is Y and Total complaint is Z} and Product-name is Prod 1, the record belongs to label 1.

Such rules may be termed fuzzy rules as they apply a form of fuzzy logic. The fuzzy rules may be established to satisfy certain objectives and goals of system 100. The rules may be extracted from predefined sets of rules within a rules library and chosen to suit a particular type of input data. At step 1125, the rules are used to assign labels to the selected training data 1115 and to thereby generate the initial labeled data at step 1130.

It should be understood that variations and modifications can be made to the embodiments described and illustrated herein without departing from the spirit of the described embodiments, the general scope of which is defined in the appended claims.

The invention claimed is:

1. A computer-implemented method of labeling data associated with data records stored in a database of a system, said system comprising a server system and a user interface in communication with the server system, the server system comprising one or more processors and a memory, the method comprising:
   receiving data associated with said data records, said data comprising labeled data and unlabeled data;
   generating a self-organizing map of the data, said self-organizing map comprising a plurality of nodes each comprising one or more of said data records;
   identifying each node in the self-organizing map that comprises at least one data record having a label, and for each said node, assigning said label of said at least one data record of said node to each unlabeled data record in said node;
   self-labeling data records, said self-labeling comprising, for each selected node in the self-organizing map that comprises at least one data record having a label:
   identifying a first plurality of nodes in said self-organizing map, each node of said first plurality being adjacent to said selected node;
   identifying a second plurality of nodes in said self-organizing map, each node of said second plurality being either adjacent to said selected node or adjacent to a node of said first plurality other than said selected node;
   where there are no nodes in said first plurality or in said second plurality comprising at least one data record having a label different from the label of the at least one data record in said selected node,
      assigning the label of the at least one data record in said selected node to each unlabeled data record in each node of said first plurality;
   where there is at least one node in said first plurality comprising at least one data record having a label different from the label of the at least one data record in said selected node,
      not assigning the label of the at least one data record in said selected node to each unlabeled data record in each node of said first plurality; and
   where there are no nodes in said first plurality comprising at least one data record having a label different from the label of said selected node but there is at least one node in said second plurality comprising at least one data record having a label different from the label of said selected node,
      assigning the label of the at least one data record in said selected node to each unlabeled data record in each node of said first plurality that is not adjacent to the at least one node in said second plurality comprising at least one data record having a label different from the label of said selected node, and
      not assigning the label of the at least one data record in said selected node to each unlabeled data record in each node of said first plurality that is adjacent to the at least one node in said second plurality comprising at least one data record having a label different from the label of said selected node; and
   after said self-labeling, training a classifier for data classification in a customer relationship management system, wherein said classifier is trained based on data of data records having a label in said self-organizing map;
   wherein said one or more processors are configured to perform said method.

2. The method of claim 1, further comprising automatically completing a data field or a user selection using the classifier.

3. The method of claim 1, further comprising repeating acts of said self-labeling.

4. The method of claim 3, wherein said acts of said self-labeling are repeated until a predetermined termination condition is satisfied.

5. The method of claim 1, wherein the assigning of a label to an unlabeled data record in a node of said self-organizing map comprises assigning a class to the data of the unlabeled data record.

6. A system for labeling data for use in classification, said system comprising:
   a database for storing data records with which said data is associated;
   a server system and a user interface in communication with the server system, wherein the server system comprises one or more processors and a memory accessible to the one or more processors and storing program instructions executable by the one or more processors, the programming instructions being arranged in a plurality of modules comprising a clustering module, a self-labeling module, and a classification module;
   wherein the clustering module is configured to cause the one or more processors to
   receive data associated with said data records, said data comprising labeled data and unlabeled data, and
   generate a self-organizing map of the data, said self-organizing map comprising a plurality of nodes each comprising one or more of said data records;
   wherein the self-labeling module is configured to cause the one or more processors to
   identify each node in the self-organizing map that comprises at least one data record having a label, and for each said node, assign said label of said at least one data record of said node to each unlabeled data record in said node, and
   perform a self-labeling of data records by, for each selected node in the self-organizing map that comprises at least one data record having a label:

identifying a first plurality of nodes in said self-organizing map, each node of said first plurality being adjacent to said selected node, identifying a second plurality of nodes in said self-organizing map, each node of said second plurality being either adjacent to said selected node or adjacent to a node of said first plurality other than said selected node, where there are no nodes in said first plurality or in said second plurality comprising at least one data record having a label different from the label of the at least one data record in said selected node, assigning the label of the at least one data record in said selected node to each unlabeled data record in each node of said first plurality, where there is at least one node in said first plurality comprising at least one data record having a label different from the label of the at least one data record in said selected node, not assigning the label of the at least one data record in said selected node to each unlabeled data record in each node of said first plurality, and where there are no nodes in said first plurality comprising at least one data record having a label different from the label of said selected node but there is at least one node in said second plurality comprising at least one data record having a label different from the label of said selected node, assigning the label of the at least one data record in said selected node to each unlabeled data record in each node of said first plurality that is not adjacent to the at least one node in said second plurality comprising at least one data record having a label different from the label of said selected node, and not assigning the label of the at least one data record in said selected node to each unlabeled data record in each node of said first plurality that is adjacent to the at least one node in said second plurality comprising at least one data record having a label different from the label of said selected node; and wherein the classification module is configured to cause the one or more processors to train a classifier for data classification in a customer relationship management system after performing said self-labeling, wherein said classifier is trained based on data of data records having a label in said self-organizing map.

7. The system of claim 6, wherein in use, a data field or a user selection is completed using the classifier.

8. The system of claim 6, wherein the self-labeling module is further configured to repeat acts in said self-labeling.

9. The system of claim 8, wherein said acts in said self-labeling are repeated until a predetermined termination condition is satisfied.

10. The system of claim 6, wherein the assigning of a label to an unlabeled data record in a node of said self-organizing map comprises assigning a class to the data of the unlabeled data record.

11. A computer program product, comprising a computer usable medium having a computer readable program code embodied therein, said computer readable program code adapted to be executed to implement a method of labeling data associated with data records stored in a database of a system, the method comprising:

receiving data associated with said data records, said data comprising labeled data and unlabeled data;

generating a self-organizing map of the data, said self-organizing map comprising a plurality of nodes each comprising one or more of said data records;

identifying each node in the self-organizing map that comprises at least one data record having a label, and for each said node, assigning said label of said at least one data record of said node to each unlabeled data record in said node;

self-labeling data records, said self-labeling comprising, for each selected node in the self-organizing map that comprises at least one data record having a label:

identifying a first plurality of nodes in said self-organizing map, each node of said first plurality being adjacent to said selected node;

identifying a second plurality of nodes in said self-organizing map, each node of said second plurality being either adjacent to said selected node or adjacent to a node of said first plurality other than said selected node;

where there are no nodes in said first plurality or in said second plurality comprising at least one data record having a label different from the label of the at least one data record in said selected node, assigning the label of the at least one data record in said selected node to each unlabeled data record in each node of said first plurality;

where there is at least one node in said first plurality comprising at least one data record having a label different from the label of the at least one data record in said selected node, not assigning the label of the at least one data record in said selected node to each unlabeled data record in each node of said first plurality;

and where there are no nodes in said first plurality comprising at least one data record having a label different from the label of said selected node but there is at least one node in said second plurality comprising at least one data record having a label different from the label of said selected node, assigning the label of the at least one data record in said selected node to each unlabeled data record in each node of said first plurality that is not adjacent to the at least one node in said second plurality comprising at least one data record having a label different from the label of said selected node, and not assigning the label of the at least one data record in said selected node to each unlabeled data record in each node of said first plurality that is adjacent to the at least one node in said second plurality comprising at least one data record having a label different from the label of said selected node; and after said self-labeling, training a classifier for data classification in a customer relationship management system, wherein said classifier is trained based on data of data records having a label in said self-organizing map;

wherein said method is executable by one or more processors.

12. The method of claim 11, further comprising automatically completing a data field or a user selection using the classifier.

13. The method of claim 11, further comprising repeating acts in said self-labeling.

14. The method of claim 13, wherein said acts in said self-labeling are repeated until a predetermined termination condition is satisfied.

15. The method of claim 11, wherein the assigning of a label to an unlabeled data record in a node of said self-organizing map comprises assigning a class to the data of the unlabeled data record.

* * * * *